United States Patent
Kratzsch et al.

(10) Patent No.: US 6,791,057 B1
(45) Date of Patent: Sep. 14, 2004

(54) METHOD AND DEVICE FOR MACHINING WORKPIECES USING HIGH-ENERGY RADIATION

(75) Inventors: Christian Kratzsch, Düsseldorf (DE); Stefan Kaierle, Herzogenrath (DE); Peter Abels, Alsdorf (DE)

(73) Assignee: Fraunhofer-Gesellschaft Zur Forderung Der Angewandten Forschung E.V., Munich (DE)

( * ) Notice: Subject to any disclaimer, the term of this patent is extended or adjusted under 35 U.S.C. 154(b) by 0 days.

(21) Appl. No.: 09/831,468

(22) PCT Filed: Nov. 10, 1999

(86) PCT No.: PCT/DE99/03578

§ 371 (c)(1),
(2), (4) Date: May 9, 2001

(87) PCT Pub. No.: WO00/29166

PCT Pub. Date: May 25, 2000

(30) Foreign Application Priority Data

Nov. 12, 1998 (DE) .......................... 198 52 302

(51) Int. Cl.[7] .................. B23K 26/00; B23K 26/02; B23K 26/04; B23K 26/14
(52) U.S. Cl. ................. 219/121.63; 219/121.62; 219/121.67; 219/121.83; 427/8
(58) Field of Search .............. 219/121.63, 121.6, 219/121.62, 121.71, 121.72, 121.83, 121.85, 121.64, 121.67; 427/8

(56) References Cited

U.S. PATENT DOCUMENTS

| 3,689,159 A | | 9/1972 | Taniguchi et al. .......... 356/123 |
|---|---|---|---|
| 4,344,699 A | * | 8/1982 | McIntosh ..................... 355/20 |
| 4,543,486 A | * | 9/1985 | Rose ..................... 219/121.14 |
| 4,789,770 A | * | 12/1988 | Kasner et al. ........... 219/121.7 |
| 4,794,238 A | * | 12/1988 | Hampton ..................... 235/454 |
| 4,924,063 A | * | 5/1990 | Buchel et al. ......... 219/121.83 |
| 5,373,135 A | * | 12/1994 | Beyer et al. ........... 219/121.67 |
| 5,382,770 A | * | 1/1995 | Black et al. ........... 219/121.63 |
| 5,463,202 A | * | 10/1995 | Kurosawa et al. ..... 219/121.62 |
| 5,486,677 A | * | 1/1996 | Maischner et al. .... 219/121.83 |
| 5,530,221 A | * | 6/1996 | Benda et al. .......... 219/121.83 |
| 5,763,853 A | * | 6/1998 | Shimomura et al. ... 219/121.62 |
| 5,850,068 A | * | 12/1998 | Peters et al. ........... 219/121.73 |
| 5,869,805 A | * | 2/1999 | Beyer et al. ........... 219/121.63 |
| 5,871,805 A | * | 2/1999 | Lemelson ..................... 427/8 |
| 6,040,550 A | * | 3/2000 | Chang ................... 219/121.63 |
| 6,075,220 A | * | 6/2000 | Essien et al. .......... 219/121.83 |
| 6,545,250 B2 | * | 4/2003 | Hartmann et al. ..... 219/121.83 |
| 2003/0157242 A1 | * | 8/2003 | Nakano et al. ................. 427/8 |

FOREIGN PATENT DOCUMENTS

| EP | 0038297 | | 10/1981 |
|---|---|---|---|
| EP | 0252268 A | * | 1/1988 |
| FR | 2039520 | | 1/1971 |
| JP | 10-296465 A | * | 11/1998 |
| WO | WO8911260 | | 11/1989 |
| WO | WO9715417 | | 5/1997 |

* cited by examiner

Primary Examiner—L. Edmondson
(74) Attorney, Agent, or Firm—Pandiscio & Pandiscio (57) ABSTRACT

A method for processing workpieces by means of high-energy radiation, wherein the radiation is focused by a processing optic onto a processing site. The light radiation emanating form the workpiece is received by the same processing optic and is analyzed by a detector. An optical measurement with respect to the surface of the workpiece is performed in a processing area of the workpiece by means of an external source of measuring light, utilizing measuring light reflected from the processing area. The same processing optic is used to focus radiation onto the processing site and to receive radiation emanating from the workpiece at the processing site.

39 Claims, 6 Drawing Sheets

Fig. 6b

METHOD AND DEVICE FOR MACHINING WORKPIECES USING HIGH-ENERGY RADIATION

BACKGROUND OF THE INVENTION

1. Field of the Invention

The invention is directed to a method for processing workpieces by means of laser radiation, wherein the radiation is focused by a processing optic onto a processing site. The light radiation emanating from the workpiece is received utilizing the processing optic and is analyzed by a detector. An optical measurement with respect to a surface of the workpiece is performed by means of an external source of measuring light, utilizing measuring light reflected from the processing area.

A method comprising the aforesaid method steps is generally known. It is used, for example, for a form of welding processing of workpieces in which the process monitoring system performs keyhole monitoring of the processing site and a distance measurement is effected by means of the external measuring-light source in order to measure or regulate the distance between the processing optic and the workpiece. The light radiation emanating from the workpiece, specifically secondary or thermal radiation produced by the welding process, passes into the processing optic isoaxially with the high-energy or laser radiation and is decoupled there for the detector of the process monitoring system. However, distance measurement or contactless mapping with respect to the geometry of the workpiece is performed by means of receiving units installed outside the processing optic-Measuring systems located outside the processing optic cause problems, however, due to the contamination of optical systems that occurs in an industrial environment, and they hamper the processing head, which is less readily accessible and cannot be used as well with complex—especially three-dimensional—workpiece geometries. In general, it can be stated that methods of workpiece processing involving on-line monitoring of the workpiece have heretofore been performed only with special systems tailored to the job concerned.

2. Description of the Prior Art

The object of the invention, by contrast, is to improve a method comprising the method steps cited in the introduction hereto in such a way that a combination of process monitoring and additional monitoring measurements can be performed on the workpieces.

SUMMARY OF THE INVENTION

This object is accomplished by using the same processing optic for the light radiation used for process monitoring and the reflected measuring light used for optical measurement. It is of significance for the invention that the processing optic detects not only the light radiation used for process monitoring, but also the measuring light used for optical measurement that is reflected by the workpiece. This eliminates the need to install measuring systems for the measuring light on a measuring head or near the processing optic, such measuring systems being lens systems that can become contaminated during industrial operation and can limit the range of application of the workpiece processing operation.

The method is suitable for all types of laser-beam sources, for example $CO_2$ lasers, Nd:YAG lasers and diode lasers. The method is also suitable for all kinds of materials processing employing high-energy or laser radiation, such as welding, cutting or coating. Owing to the integration of plural measuring methods into the area of the processing optic, the method is suitable for all types of process and quality monitoring, especially in the areas of tailored blanks and 3D contour processing.

Integrating the measuring systems into the area of the processing optic has numerous advantages. Especially notable is compact construction in the region of the processing head. Components required for known methods are no longer needed. The result is a proportionate decrease in maintenance expenditure, since, for example, it is no longer necessary to clean additional optics. The procedures involved in processing a workpiece are simplified, since fewer structural components have to be attended to and the integration of the measuring steps simplifies analysis of the measurement results. The overall cost of the method is therefore decreased.

The method can advantageously be realized so that the light radiation used for process monitoring and the reflected measuring light are detected, utilizing the same processing optic, isoaxially or approximately isoaxially with the light radiation or axially parallel thereto. Such detection ensures that the processing optic and hence the processing head can be used without any major changes of the kind made necessary by overly large angles or oblique lines of sight, for example widening of the hole in a hole mirror.

The method is, in particular, universally applicable. It is suitable for all types of optical measurements relating to the workpiece during processing. This is of significance because quality assurance during processing demands an extremely wide variety of measurements with respect to the workpiece. To this end, the method can be performed so that the optical measurement performed with respect to the workpiece surface is a measurement of the distance between the processing optic and the workpiece and/or a mapping of the workpiece geometry before the processing site and/or a mapping of the seam geometry present after processing and/or a mapping of the melt produced at the processing site. Mapping of the distance between the processing optic and the workpiece is necessary, for example, in applications where the workpiece exhibits dimensional changes in the direction of the laser beam. Mapping of the workpiece geometry before processing serves to detect geometric defects such as edge displacement, gaps, etc., and permits seam tracking. Mapping of the seam geometry present after processing can be used to regulate process variables so as to maintain a given seam quality. Mapping of the melt produced at the processing site furnishes comparative data for comparison with reference values from processing operations having defined parameters, any discrepancies being evidence of processing errors. The foregoing optical measurements do not constitute an exhaustive list. They do, however, make it possible to simplify the most significant industrial methods in order to achieve the object stated in the introduction hereto.

The method can preferably be performed so that different zones I, II, III of the processing area of the workpiece are detected by means of the same detector. Metrologic sensing of different zones of the workpiece processing area serves to eliminate distortion from measurement tasks, since a larger area can be measured. This simplifies control of the processing operation. For example, the workpiece geometry can be detected at a greater distance from the processing site, malting it possible to take compensatory action, for example by the control of guide rollers positioning the workpiece. It is possible to work with different qualities of light at different locations in the processing area, for example with light of different intensities. All such measurement tasks can be performed with one and the same detector, making for considerable method integration.

The method can be performed so that the first zone of the processing area is taken to be the region of an interaction zone, the second zone, encompassing the first, is taken to be the region of the melt, and the third zone is taken to be the processing area as a whole. These zones of a workpiece processing area exhibit typical characteristic curves for the light radiation and typical geometrical characteristics that can be used to influence process control. For example, in a given processing task the melt has a typical shape and dynamics that can be mapped optically to draw conclusions regarding disturbances of the process.

The manner of proceeding is advantageously such that the sensing of different zones of the processing area takes place simultaneously. Performing all the measurement tasks simultaneously eliminates delays in the monitoring and control of the processing method, thus reducing the susceptibility to error of the processing operations.

The method can be performed so that the light radiation used for process monitoring is secondary radiation from the interaction zone, and used as reflected measuring light is measuring light from regions of the processing area surrounding the interaction zone. Process monitoring by means of secondary radiation from the vapor capillary is a proven method, but it entails dealing with high light intensities and high intensity fluctuations. To preclude the resulting disruptions of the optical measurement that also must be performed—and, in particular, simultaneously—the light from the regions of the processing area surrounding the vapor capillary is used as reflected measuring light. It is preferred that such measuring light come from the third zone, i.e., from the portion of the processing area surrounding the melt.

To enable the largest possible number of measurement tasks to be performed in the work area, the approach can be such that sensing of the processing area as a whole, i.e., the region of measurement, is performed by means of a detector with local resolution. The quality of the local resolution performed by the detector determines the multiplicity of such sites and the quality of the measurements. The detector can be realized in different ways to suit the needs of the welding task concerned. In contrast to averaging detectors, such detectors can also reliably detect variable processes taking place in the processing area, for example dynamic motions in the region of the melt.

The method employing a detector that performs local resolution can be implemented so that all the sensors of the detector can read out for analysis the observation windows of at least two sensors forming zones of the processing area. Detectors with linearly arranged sensors are especially well suited for linear or planar seam geometries. Detectors with areally arranged sensors are preferentially suited for three-dimensional workpiece geometries.

When detectors with a large number of individual sensors are used, large quantities of data must be processed in a short time if high readout rates are required for sufficiently fast process adjustment, for example in the case of on-line monitoring. This can place high demands on the efficiency of the process monitoring system and thus on the analyzing units. It is advantageous, therefore, to reduce the amount of data generated. To this end, the method is advantageously performed so that a detector having linearly or areally arranged sensors is used. For example, an observation window aimed at the vapor capillary and an observation window aimed at the finished seam are provided. The data from these windows can be analyzed at a high clock rate, so that even rapid process sequences can be analyzed reliably.

The method described hereinabove can be improved so that observation windows are varied with respect to position and size on the basis of detector data and/or so that analysis of the results of optical measurement is suspended intermittently based on analytical data from the detector. For example, a window for determining seam tracking or seam mapping by the light section method can be limited to a few pixels around the seam. If, in this example, the position of the seam changes, for example due to a positioning error or an unstraight path, then the analyzed image of the seam from the window can be used to determine how the window must be shifted or enlarged so that the seam can continue to be tracked or mapped. The amount of data can also be reduced by not analyzing the results of simultaneous measurements. For example, it is not necessary to perform distance measurement, mapping of the workpiece geometry, mapping of the seam geometry or mapping of the melt as long as no errors are being detected by the process monitoring system. Only when the processing monitoring system does detect errors is one or more of the foregoing measurements or mapping operations carried out.

The invention is also directed to a device for processing workpieces by means of high-energy radiation, particularly by means of laser radiation. The device comprises a processing optic that focuses the radiation onto a processing site and that detects light radiation emanating from the workpiece for a detector of a process monitoring system having a predefined optical axis. The device further comprises an external measuring-light source whose measuring light is reflected from a processing area of the workpiece and is used to perform an optical measurement at the surface of the workpiece. The measuring light is detected by means of the same processing optic that focuses the radiation onto the processing site.

A major advantage of the aforesaid device is compact construction in the area of the processing head. The device can also perform geometrically complex processing tasks without the disruptive effects of externally placed measuring-light sensors. Individual measuring systems can be fully integrated into the processing head, at least at the measurement end. Measurement results can be obtained with a reduced number of detectors or sensors, all employing the same processing optic.

The device can advantageously be realized so that the measuring light can be detected within the predefined optical axis of the light radiation emanating from the workpiece, or approximately isoaxially therewith or parallel thereto, by means of one and the same processing optic. Measurements can preferably be performed within the optical axis of the light radiation from the workpiece or parallel to said optical axis. The optical axis itself can also coincide with the axis of the high-energy or laser radiation. This can substantially reduce the overall cost of the device.

It is advantageous to realize the device so that there is a single detector suitable for observing different zones of the processing area of the workpiece, with local resolution if necessary. The use of a single detector aids substantially in simplifying the mechanical construction of the device. Simple retrofitting to existing installations is facilitated, in particular. In such cases the detector can be adapted to the observation tasks concerned, for example by having observation characteristics with local resolution that are adapted to different zones of the processing area of the workpiece.

To make use of processing heads of proven design, the device is realized so that a component decoupling the measuring light and/or the light radiation is disposed in the beam path of the high-energy or laser radiation. Such components are, for example, dichroic mirrors that either reflect or are transparent to the laser radiation. Focusing hole mirrors, scraper mirrors or decoupling prisms can also be used. Their usage is determined, for example, by the radiation intensity of the laser radiation or by the beam quality.

A further substantial improvement of the device can be achieved by disposing the source of measuring light inside a processing head comprising the processing optic. This results in full integration of the entire measuring-light guidance system.

The above-described full integration can, in particular, be achieved by structurally combining the measuring-light source with the decoupling component or by arranging it spacedly in front of or behind said component As a result, the region of the processing optic free of built-in components and the measuring-light source is protected to at least the same degree as the processing optic installed in the processing head.

An advantageous improvement of the device is distinguished by the fact that the measuring light from the measuring-light source is projected onto the workpiece at an angle with respect to the predefined optical axis. Optical measurement can then be performed by triangulation. For triangulation with the light-section method, the angle between the direction of incidence of the measuring-light beam on the workpiece and the predefined axis of the processing optic must be less than 0 and more than 90 angular degrees. This condition is satisfied by the previously described embodiment of the device.

In particular, the device is realized such that the measuring light from the measuring-light source is projected onto the workpiece as the envelope of a cone or truncated cone and/or as straight line segments. Projection of the measuring light as the envelope of a cone can be accomplished by means of one or more light generators arranged in the processing head as space permits. This is also possible with projection of the measuring light as straight line segments, if plural light generators generate light in straight line segments so arranged on the workpiece as to produce a desired light line thereon. For example, a circular line can be approximated by means of individual straight segments.

One basic problem is how to analyze process illumination simultaneously for more than one monitoring operation. A particular problem in this connection is that of distinguishing the measuring light being used for optical measurement from such light radiation originating, for example, as secondary radiation from the processing site on the workpiece. To eliminate this inconvenience, the device is realized so that the measuring light from the measuring-light source is amplitude-modulated at a fixed frequency. The modulation frequency used must be less than half the scanning rate of the detector. The detector signals can be analyzed frequency-selectively with respect to the modulation frequency by known signal processing methods, for example by fast Fourier transformation. The device can increase reliability in recognition of the measuring-light aperture through improvement of the signal-to-noise ratio.

A further embodiment of the device can be realized in that the measuring light from the measuring-light source can be applied to different observation sites on the workpiece in temporal succession with repetition at a high frequency. In particular, a circular shape or other desired shape for the measuring-light line on the workpiece can be produced by means of mutually aligned light spots or line segments, if these can be generated in succession on the predefined light path at a sufficiently high rate. To this end, for example, the measuring-light source itself can rotate or the measuring light can be deflected by rotating mirrors, especially in the case of circular deflection.

However, the problem of disruption of the optical measurements by the process illumination can also be solved by means of an embodiment of the device in which the detector has a dynamic range extending over plural decades of luminous or radiation intensity. Such a detector can be a CMOS camera, for example.

The aforesaid problem can also be solved by means of an embodiment of the device in which disposed ahead of the detector is an optical filter system possessing characteristics that delimit the observation zones of the processing area. Such filter systems are provided with special filters whose filter characteristic is adapted to the observation-zone-delimiting functions to be performed in this case. Such filters include mere attenuating filters and wavelength-selective filters.

BRIEF DESCRIPTION OF THE DRAWINGS

The invention is described with reference to the exemplary embodiments depicted in the drawings, wherein.

DESCRIPTION OF THE PREFERRED EMBODIMENTS

Figure 1:
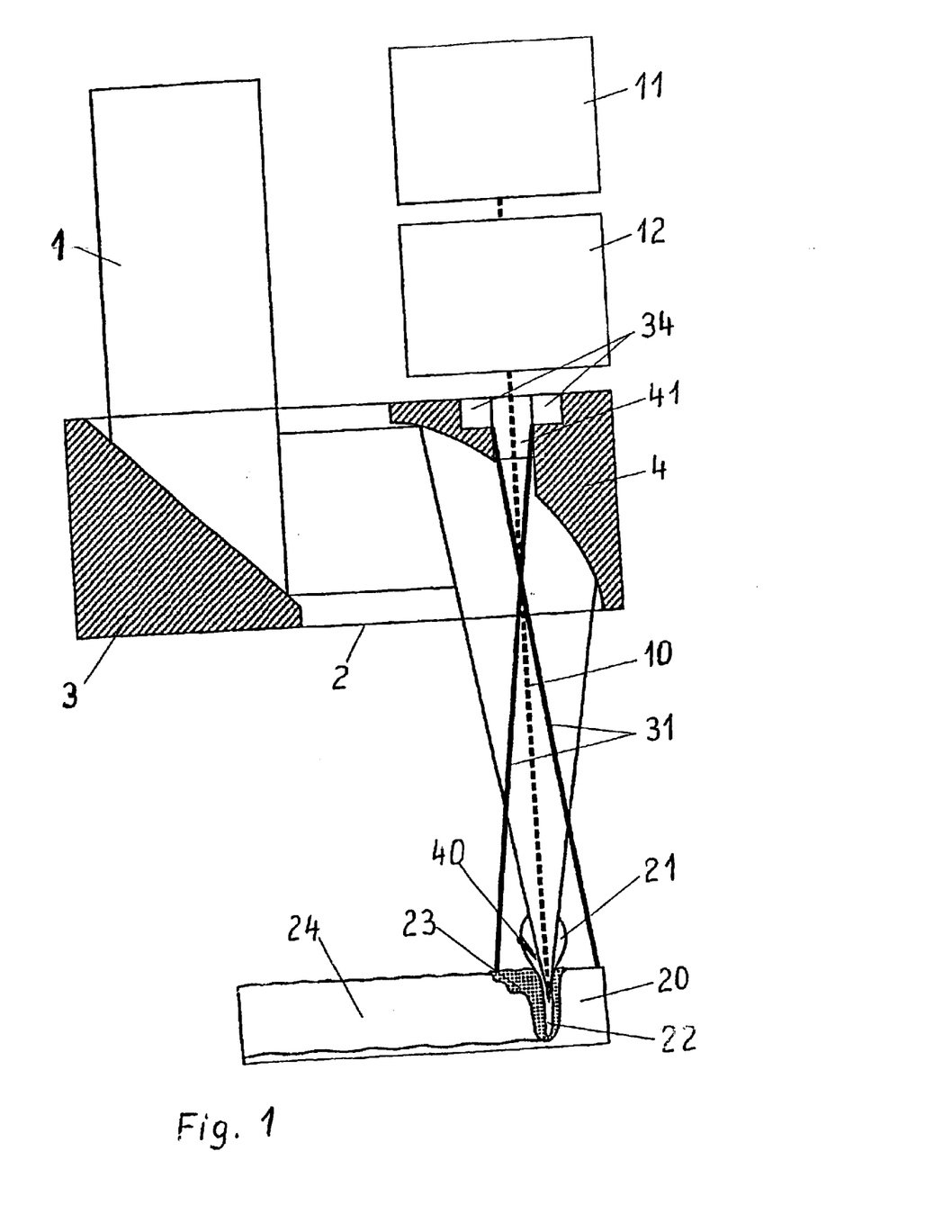
FIGS. 1 to 3 are diagrammatic representations of workpiece processing devices.

FIG. 1 shows, as a rectangle, a housing 2 of a processing optic, consisting of a deflecting mirror 3 and a hole mirror 4, by means of which the laser radiation 1 is projected onto a workpiece 20, the hole mirror 4 focusing the laser radiation onto a processing site 40 of a workpiece 20. The laser radiation 1 is of such high energy that a vapor capillary 22 forms in the workpiece 20 at the processing site 40 and causes the vaporization of work material, with the subsequent formation of a plasma 21. It is not absolutely necessary for a vapor capillary 22 to form at the processing site 40, i.e., in the region of the interaction zone in which the energy of the laser radiation 1 is coupled into the workpiece 20. The processing method can also be one in which the threshold of plasma formation is not exceeded. The workpiece 20 is moved relative to the laser radiation 1, so that, in the welding operation shown, a weld seam 24 is formed. A region of the melted workpiece 20 surrounding the vapor capillary 22 is liquefied and is depicted as a melt 23.

The heating of the workpiece 20 produces thermal radiation that enters the region of the processing optic as secondary light radiation. The axis of this light radiation is denoted by 10. It is predefined by the hole 41 present in the hole mirror 4. Since mirror 4 is realized as solid, for example as a solid copper mirror designed to reflect intense laser radiation from a $CO_2$ laser, hole 41 is cylindrical and its orientation with respect to processing site 40 affects the arrangement of axis 10. As dictated by this axis, the secondary light radiation passes through an optical system. 12 to a detector 11.

Figure 2:
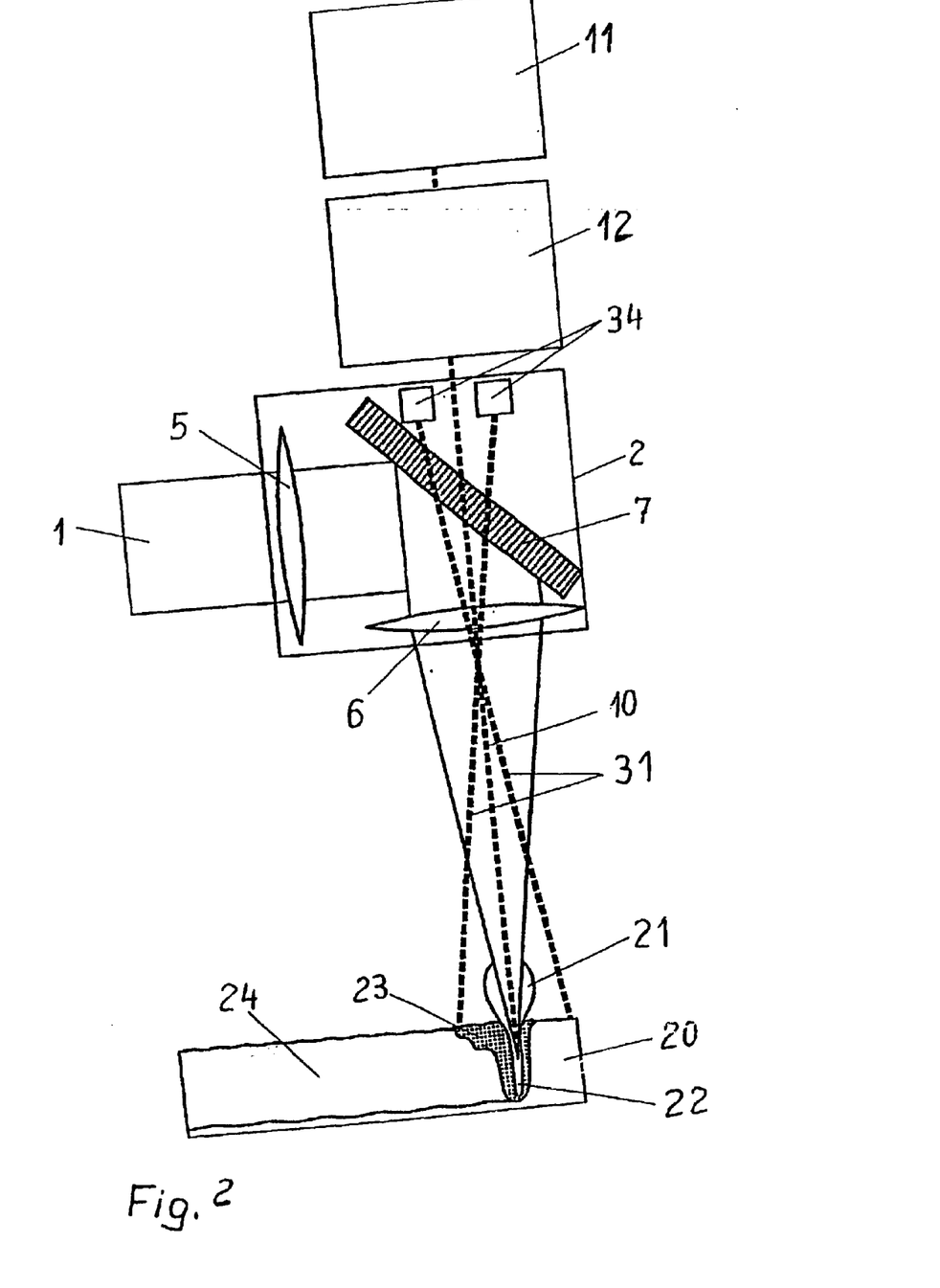
Figure 3:
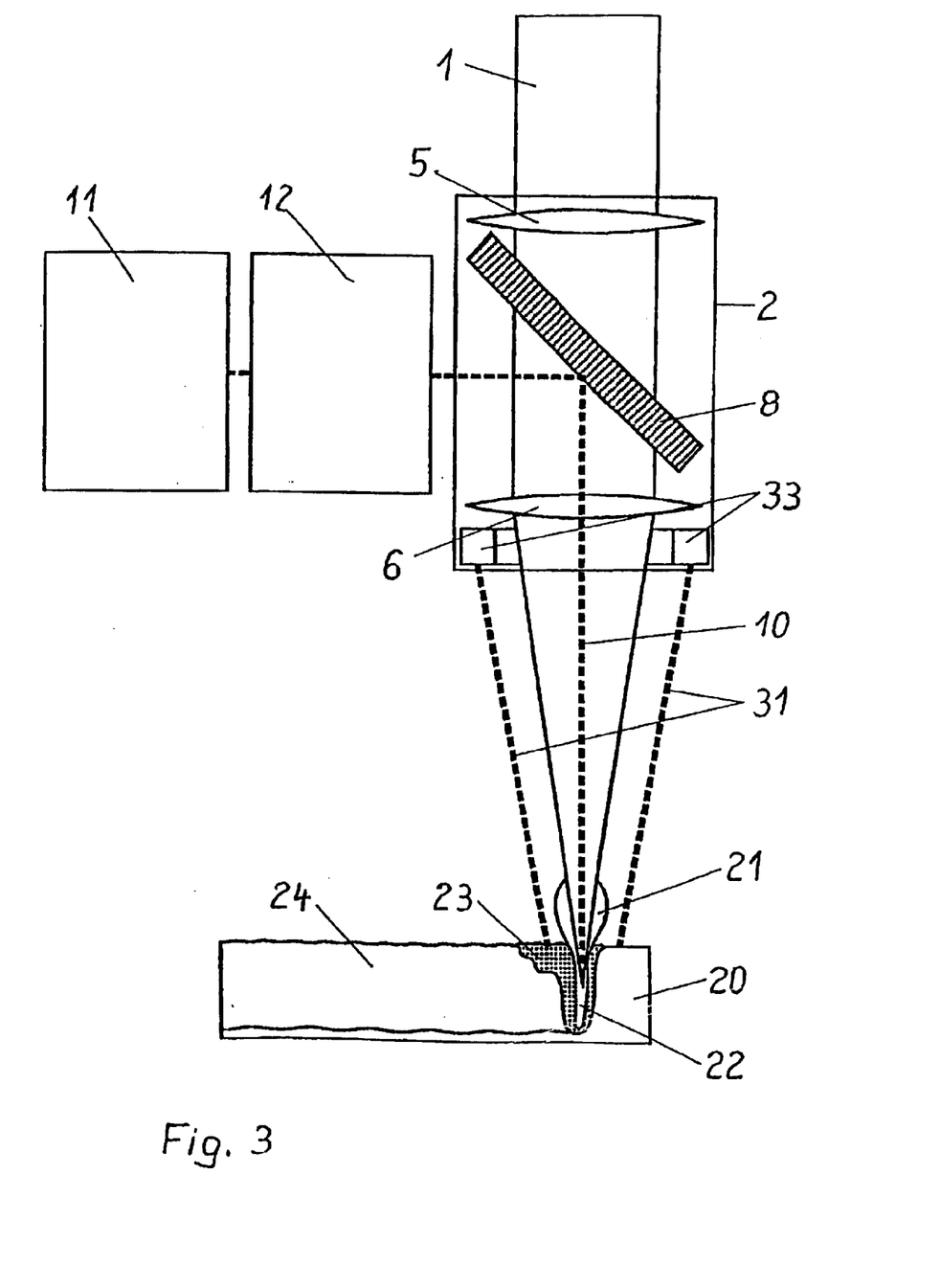

In FIGS. 2 and 3, a processing optic mounted inside the housing 2 consists of a collimating lens 5 and a focusing lens 6 disposed thereafter in the direction of the laser radiation 1. Between the two lenses 5, 6 is a dichroic mirror 7, 8 that has different transmission and reflection characteristics for light of different wavelengths. Dichroic mirrors lend themselves in particular to workpiece processing with Nd:YAG lasers. Dichroic mirror 7 of FIG. 2 reflects the laser radiation 1, but is transparent to light radiation coming from the workpiece 20. Lenses 5, 6 are accordingly disposed at an angle, as shown in the drawing, so that the horizontally emitted laser radiation 1 is deflected at a right angle to focusing lens 6, which focuses it on workpiece 20. Dichroic mirror 8 of FIG. 3, by contrast, is transparent to the laser radiation 1. Lenses 5, 6 are therefore arranged successively in the radiation direction of the radiation 1, enclosing mirror 8. It, however, reflects the secondary light radiation coming from workpiece 20, so that optical axis 10 is deflected according to the arrangement of mirror 8. In accordance with this optical behavior of mirrors 7, 8, optical system 12 and the detector are disposed above housing 2 in FIG. 2 and to the left of housing 2 in FIG. 3.

Figure 4A:
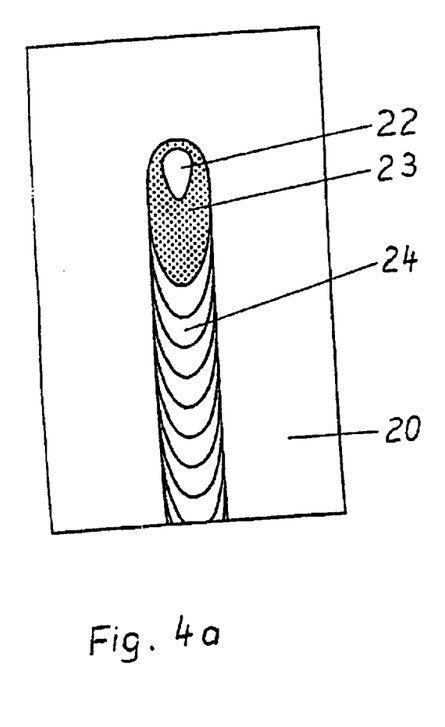
FIGS. 4a and 4b are views of the processing areas of a workpiece.
Figure 4B:
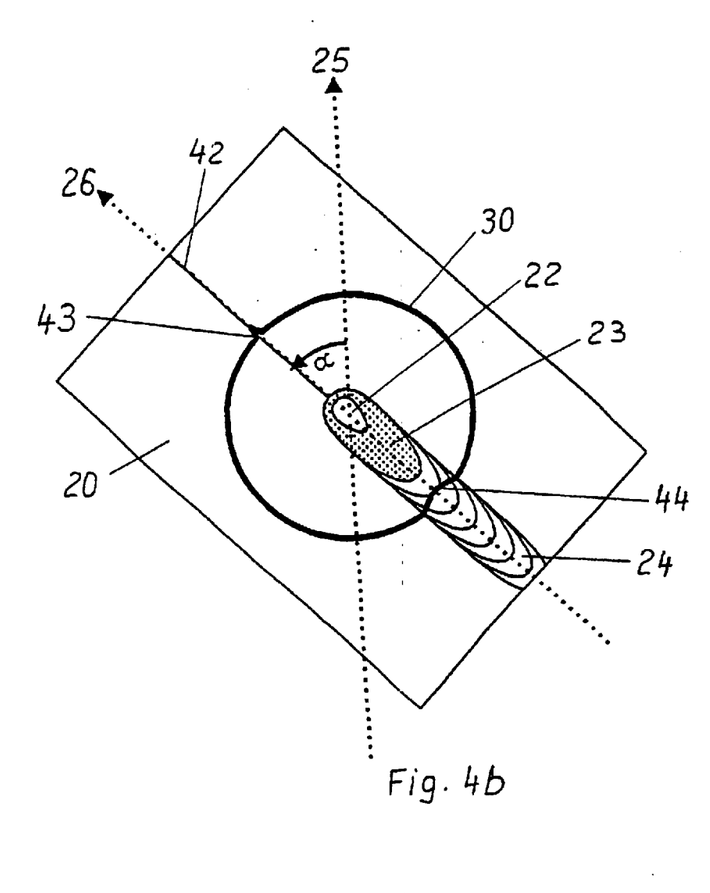

FIGS. 4a and 4b show the processing area of the workpiece 20 in the direction of the laser radiation 1, but without the processing optic. A finished weld seam 24 adjoins the melt 23, in which the vapor capillary 22 is located. Since different processes are taking place and different conditions are therefore present in the vapor capillary 22, the melt 23 and the finished weld seam 24, it is advantageous to define zones that differ in a corresponding manner. The first Zone I of the processing area is considered to be the region of vapor capillary 22. The second Zone II is considered to be the region of the melt surrounding the first Zone I and the third Zone III is considered to be the region of weld seam 24 and the processing area surrounding or delimiting Zones I and II and weld seam 24. In practice, the processing area can have an edge length of a few centimeters.

The processing area is observed by a single detector, which is located after the optical system 12 in the direction of reception of the radiation as depicted in FIGS. 1 to 3. Such detectors possess linearly or areally arranged sensors that detect over a plurality of pixels.

Figure 5A:
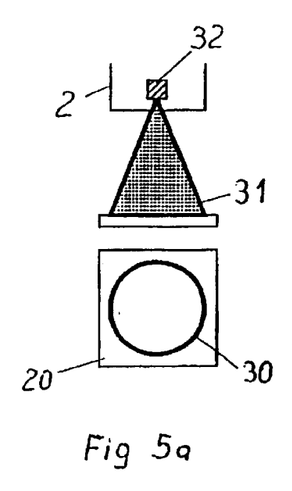
FIGS. 5a to 5f are diagrammatic representations explanatory of the arrangement and action of measuring-light sources.

Line or area sensors are preferably used for observation accompanied by local resolution. The radiation incident on one or more pixels is analyzed differently according to the sensor arrangement and is assigned to different locations in the processing area. Thus, sensors can be used to observe Zone I, other sensors to observe Zone II, and third sensors of the same detector to observe Zone III. Individual ones of these sensors can form windows that are assigned to only one sub-area of a zone. In particular some of the sensors of detector 11 are assigned to observe Zone I in order to detect light radiation used for process monitoring, i.e., the secondary light radiation from the vapor capillary 22. Further, at least one additional group of sensors is assigned to detect measuring light that is reflected by the processing area during an optical measurement. FIG. 4b provides a representation of light line 30 on the workpiece 20 in which the light line is projected in the shape of a circle. The center of the circle coincides with the vapor capillary 22 and is therefore defined by the position of the optical axis 10. By means of line 30, the workpiece geometry can be tracked ahead of the processing site 40 and in the region of the finished seam 24. For purposes of explanation, FIG. 4b shows a joint line 42 formed between two mutually abutting workpiece portions. If these workpiece portions do not fit completely snugly against each other, a pit is present and a "fraying" 43 of light line 30 can be seen, since the light is not projected onto workpiece 20 vertically to the plane of representation, but instead, for example as shown in FIG. 5a, at an angle to optical axis 10. In the region of weld seam 24, the "fraying" 43, which is an outward fraying in FIG. 4b, is located opposite a centripetally oriented concavity 44 of the circular light line, since the weld seam is elevated above the level of the workpiece 20. Different seam geometries therefore result in different light paths, for example in the presence of notches, seam convexities, seam concavities or holes. Similarly, mapping of the workpiece geometry ahead of the processing site 40 permits the detection of edge displacement or cracking, for example.

FIG. 4b further shows that the orientation 26 of workpiece 20 and the orientation 25 of detector 11 need not be the same, but instead can form an angle $\alpha$. It is still possible to perform correct measurements, especially when a detector having areally arranged sensors is used, since the different orientations 25, 26 of detector 11 and workpiece 20 are known and can therefore be considered mathematically in the analysis performed by the detector.

Light line 30 depicted on workpiece 20 is produced by suitable projection by means of a measuring-light source 32 to 34. The projection is such that the optical measurements can be performed by the method of triangulation, for example in connection with the light section method. For triangulation to be performed, there must be an angle of less than 90 angular degrees between the direction of incidence of the measuring-light beam 31 on the workpiece 20 and the predefined optical axis 10. If a circular line 30 is to be made on the workpiece 20, this can be accomplished, as shown in FIG. 5a, by means of a pinpoint measuring-light source 32 projecting its beam 31 of measuring light as the envelope of a cone. This can be achieved, for example, by having the measuring-light source 32 project the beam 31 of measuring light through a dichroic mirror concentrically with the axis 10.

Figure 5B:
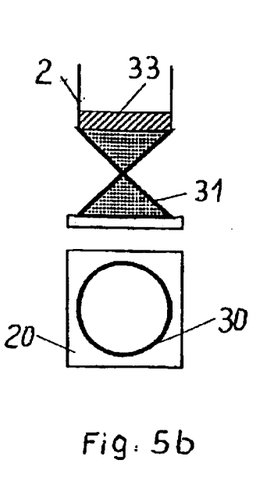
Figure 5C:
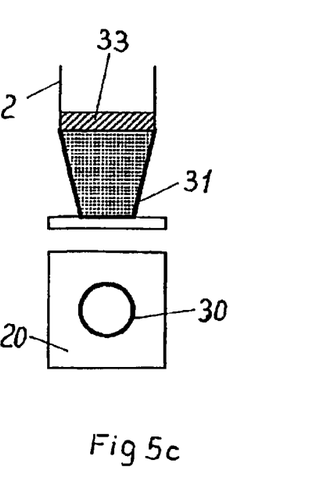

FIGS. 5b and 5c also depict embodiments of measuring-light sources 33 that project circular light lines 30 onto the workpiece 20. The measuring-light sources 33 can, for example, be composed of ring lamps or a plurality of annularly arranged generators of spots or dotted lines of light, from which generators the beam 31 of measuring light is projected, as shown, as a double cone or the envelope of a truncated cone, i.e., with a decreasing circle diameter.

Figure 5D:
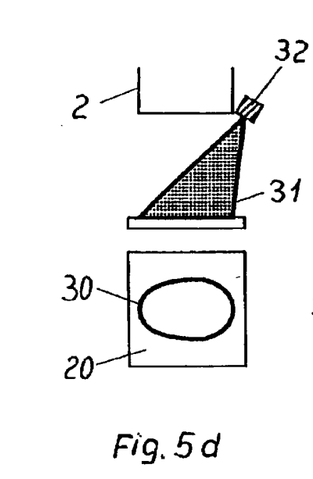
Figure 5E:
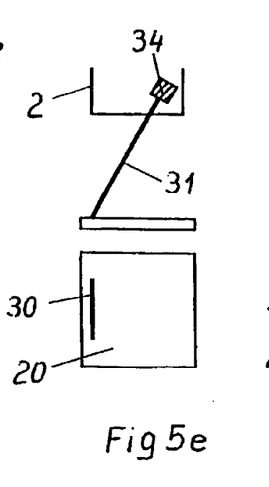
Figure 5F:
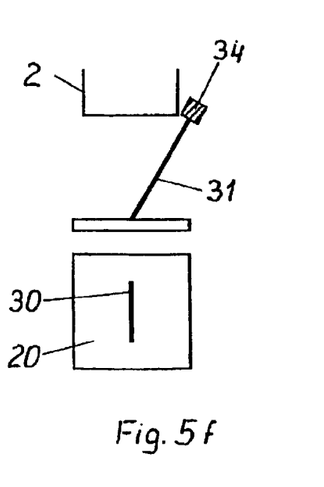

FIGS. 5d to f show that the line 30 of measuring light on the workpiece does not necessarily have to be circular. FIG. 5d shows an ellipsoid line 30 produced by a measuring-light source 32 disposed next to the housing 2 of the processing optic. In this case, the measuring light consequently is not emitted from the region of the processing optic 2, but instead, the measuring light reflected by the workpiece 20 is received utilizing the processing optic. Line segments are projected onto the workpiece 20 by means of the measuring-light sources 34. Such straight lines or line segments are adequate when only limited portions or windows of the processing area are to be monitored, for example transversely to the joint line 42 and/or to the finished weld seam 24. Defective joint lines 42 or weld seams 24 cause the measuring light to be reflected in a manner that deviates from the ideal shape, i.e., from circularity or linearity. When a circle or an ellipse is being projected at known angles of projection, the distance between the workpiece 20 and the processing optic can be calculated by determining diameters of the lines on the workpiece 20.

FIGS. 5e and 5f show that the measuring-light sources 34 can also be arranged inside the housing 2 in the region of the processing optic or outside said housing. Exemplary embodiments of the arrangement of measuring-light sources inside the housing 2 are provided in FIGS. 1 to 3. FIG. 1 depicts two measuring-light sources 34 for producing light lines on the workpiece 20. A measuring-light source 34 on the joint-seam side projects its beam 31 of measuring light into Zone II, i.e., into the region of the melt. A measuring-light source 34 disposed on the weld-seam side projects a beam 31 of measuring light through the hole 41 onto the region of the joint line 42. Reflected measuring light from both beams 31 of measuring light can pass through hole 41 isoaxially with the secondary light radiation from Zone I or parallel to this axis 10 into the region of the detector. In this way an optical measurement is performed at each of two different locations, in addition to measurement of the light radiation from the region of Zone I. In this arrangement the measuring-light sources 34 are protected against the laser radiation 1 and are located after the hole mirror 4.

In the arrangement of FIG. 2, there are two measuring-light sources 34 arranged in a geometry similar to that of the measuring-light sources 34 of FIG. 1. The measuring light they project, corresponding to measuring-light beams 31, passes through dichroic mirror 7 and produces measuring sites in the regions of Zones II and III, from which reflected measuring light passes back through dichroic mirror 7 into detector 11.

FIG. 3 shows the arrangement of a measuring-light source 33 that is disposed inside housing 2 between focusing lens 6 and workpiece 20. Its beams 31 of measuring light are realized as the envelope of a truncated cone, since they generated ring-shaped light. Disposing measuring-light source 33 in front of mirror 8 and lens 6 in the direction of the laser radiation permits greater latitude of design in the region of the processing optic, and especially in choosing the shape of the measuring-light beam. This shape in turn makes it possible to perform not only distance measurement, but also mapping of the workpiece geometry and the geometry of the melt 23 in addition to process monitoring.

The analysis of the measuring-light radiation by means of the above-described single detector 11, which can be realized for example as a CCD camera, takes place as dictated by analytical needs. For example, process monitoring can be performed by analyzing emitted light radiation at one or more points in the region of Zone I. This can also include analysis of the temporal means, such as the temporal behavior of the amplitudes of the pixels or even groups of pixels.

With regard to process monitoring, all known monitoring methods can be performed as usual, such as plasma monitoring, detection of root penetration, weld depth measurement, measurement of capillary geometry, etc. In these forms of process monitoring of the light from the workpiece, i.e., the emitted or reflected radiation, high radiation intensities and luminosities are normally encountered. This must consequently be taken into account in detecting the measuring light reflected by the workpiece 20, which light does not possess such luminosity. The detector is therefore preceded by the optical system 12, consisting of filters or lenses that are able to separate the light from Zone I from that of Zones II and III, unless the detectors used have a high dynamic range and do not require such separation.

Figure 6A:
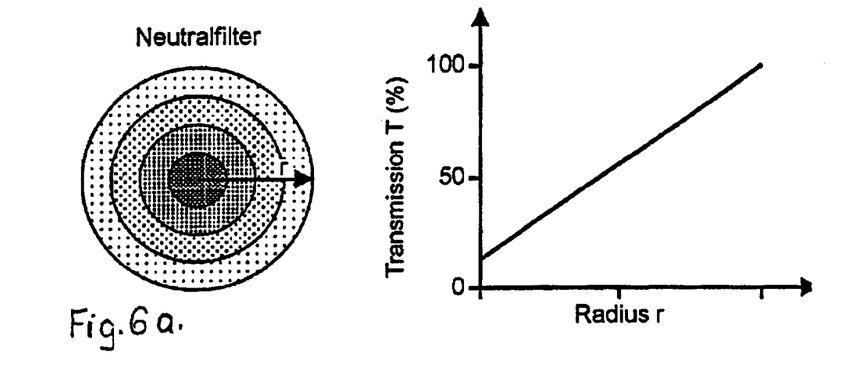
FIGS. 6a and 6b are diagrammatic representations explanatory of selective filters.
Figure 6B:
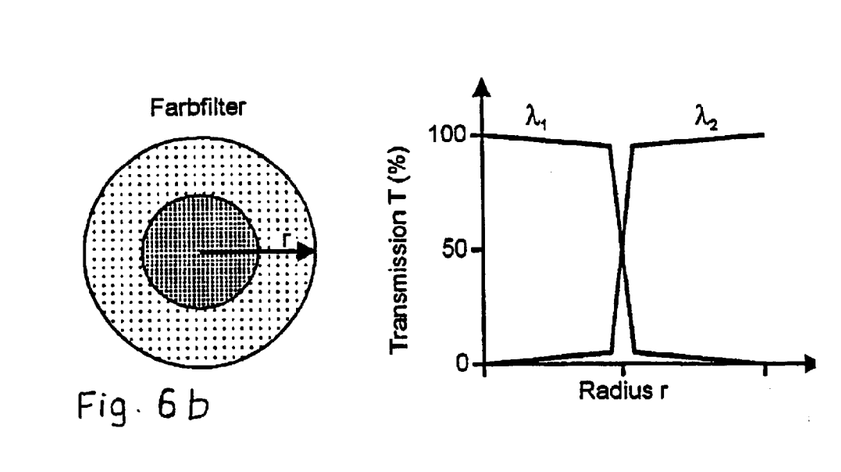

FIGS. 6a and 6b show special filters with filter characteristics that depend on the filter radius r. FIG. 6a shows a neutral filter that is depicted as an attenuating filter. Its transmission rate increases from the inside outwardly. It therefore allows little light to pass near the midpoint of the radius, thus screening out the bright luminous radiation from Zone I. Large radii, on the other hand, have a higher transmission rate of up to 100%, so that even comparatively dark measuring light can be detected. FIG. 6b shows a color filter that has a different transmission rate for different wavelengths of light. For instance, using small radii the filter transmits only light of the wavelength $\lambda 1$, whereas with larger radii it transmits only light of the wavelength $\lambda 2$. Hence, the measuring light can be light of wavelength $\lambda 2$ that is different from the wavelength $\lambda 2$ of the light from Zone II, and the different qualities of light therefore do not disrupt analysis of the measurements, even in the case of simultaneous analysis.

What is claimed is:

1. A device for processing workpieces, the device comprising:

a laser beam radiation means for projecting a laser beam;

a measuring light source for directing a non-laser measuring beam of less luminosity than the laser beam along an axis and onto a processing site;

a processing optic for focusing the laser beam along the axis and onto a work piece at the processing site and for receiving measuring light radiation from the processing site along the axis; and an optical monitoring system for receiving the measuring light radiation, said system being adapted to optically monitor a surface of the workpiece;

wherein a detector portion of said monitoring system has a dynamic range extending over plural decades of luminous and radiation intensity.

2. The device in accordance with claim 1, wherein disposed ahead of the detector portion is an optical filter system adapted to delimit observation zones of the processing area.

3. A method for processing workpieces by laser radiation and for simultaneously effecting optical measurement of a surface of the workpiece, the method comprising the steps of:

projecting a laser beam and focusing the laser beam by a processing optic assembly along an axis and onto the workpiece at a processing site to effect selected processing of the workpiece;

projecting a non-laser measuring light of less luminosity than the laser beam along the axis and onto the processing site; and directing measuring light reflected along the axis from the processing site to an optical monitoring system for monitoring the surface of the workpiece.

4. The method in accordance with claim 3, wherein the projected measuring light and the reflected measuring light pass through the processing optic assembly.

5. A device for processing workpieces, the device comprising:

a laser beam radiation means for projecting a laser beam along an axis and onto a workpiece at a processing site;

a measuring light source for directing a non-laser measuring light beam of less luminosity than the laser beam along the axis and onto the processing site;

a processing optic for focusing the laser beam along the axis and onto a workpiece at the processing site and for receiving measuring light radiation from the processing site along the axis; and an optical monitoring system for receiving the measuring light radiation, said system being adapted to optically monitor a surface of the workpiece.

6. The device in accordance with claim 1, wherein the monitoring system is adapted for observing different zones of a processing area of the workpiece with local resolution.

7. The device in accordance with claim 1, wherein a component decoupling the measuring light and the light radiation is disposed in a beam path of the laser radiation.

8. The device in accordance with claim 1 wherein said measuring light source is disposed inside a processing head comprising said processing optic.

9. The device in accordance with claim 7, wherein said measuring light source is structurally combined with said decoupling component.

10. The device in accordance with claim 1, wherein the measuring light from said measuring light source is projected onto the workpiece as an envelope of a selected one of (i) a cone, (ii) a truncated cone, and (iii) as straight line segments.

11. The device in accordance with claim 1, wherein the measuring light from said measuring light source is amplitude-modulated at a fixed frequency.

12. The device in accordance with claim 1, wherein the measuring light from said measuring light source can be applied to different observation sites of the workpiece in temporal succession with repetition at a high frequency.

13. A method for processing workpieces by laser radiation and for simultaneously effecting optical measurement of a surface of the workpiece, the method comprising the steps of:

projecting a laser beam and focusing the laser beam by a processing optic assembly along an axis and onto the workpiece at a processing site to effect selected processing of the workpiece;

projecting a non-laser measuring light of less luminosity than the laser beam along the axis and onto the processing site; and directing measuring light reflected along the axis from the processing site to an optical monitoring system for monitoring the surface of the workpiece;

wherein a detector portion of the monitoring system exercises a dynamic range extending over plural decades of luminous and radiation intensity.

14. The method in accordance with claim 13, wherein the projected measuring light and the reflected measuring light pass through the processing optic assembly.

15. The method in accordance with claim 13, wherein an optical measurement performed with respect to the workpiece surface is a selected one of (i) a measurement of a distance between the processing optic and the workpiece, (ii) a mapping of the workpiece geometry before the processing site, (iii) a mapping of a seam geometry present after processing, and (iv) mapping of a melt produced at the processing site.

16. The method in accordance with claim 13, wherein different zones of a processing area of the workpiece are detected by means of a detector portion of the optical monitoring system.

17. The method in accordance with claim 16, wherein a first of the zones of the processing area comprises an interaction zone, a second of the zones encompassing the first zone, comprises a region of melt, and a third of the zones comprises a whole of the processing area.

18. The method in accordance with claim 17, wherein sensing of the different zones of the processing area takes place simultaneously.

19. The method in accordance with claim 17, wherein the reflected measuring light is from regions of the processing area surrounding the interaction zone.

20. The method in accordance with claim 18, wherein the sensing of the processing area as a whole is performed by means of the detector with local resolution.

21. The method in accordance with claim 20, wherein the detector is provided with a selected one of linearly and areally arranged sensors.

22. The method in accordance with claim 21, wherein all the sensors of the detector read out for analysis observation windows of at least two sensors forming the zones of the processing area.

23. The method in accordance with claim 22, wherein the observation windows are varied with respect to position and size on a basis of detector data, and analysis of results of optical measurements is suspended intermittently based on analytical data from the detector.

24. The method in accordance with claim 3, wherein an optical measurement performed with respect to the workpiece surface is a selected one of (i) a measurement of a distance between the processing optic and the workpiece, (ii) a mapping of the workpiece geometry before the processing site, (iii) a mapping of a seam geometry present after processing, and (iv) mapping of a melt produced at the processing site.

25. The method in accordance with claim 3, wherein different zones of a processing area of the workpiece are detected by means of a detector portion of the optical monitoring system.

26. The method in accordance with claim 25, wherein a first of the zones of the processing area comprises an interaction zone, a second of the zones encompassing the first zone, comprises a region of melt, and a third of the zones comprises a whole of the processing area.

27. The method in accordance with claim 26, wherein sensing of the different zones of the processing area takes place simultaneously.

28. The method in accordance with claim 26, wherein the reflected measuring light is from regions of the processing area surrounding the interaction zone.

29. The method in accordance with claim 27, wherein the sensing of the processing area as a whole is performed by means of the detector with local resolution.

30. The method in accordance with claim 29, wherein the detector is provided with a selected one of linearly and areally arranged sensors.

31. The method in accordance with claim 30, wherein all the sensors of the detector read out for analysis observation windows of at least two sensors forming the zones of the processing area.

32. The method in accordance with claim 31, wherein the observation windows are varied with respect to position and size on a basis of detector data, and analysis of results of optical measurements is suspended intermittently based on analytical data from the detector.

33. The device in accordance with claim 5, wherein the monitoring system is adapted for observing different zones of a processing area of the workpiece with local resolution.

34. The device in accordance with claim 5, wherein a component decoupling the measuring light and the light radiation is disposed in a beam path of the laser radiation.

35. The device in accordance with claim 5, wherein said measuring light source is disposed inside a processing head comprising said processing optic.

36. The device in accordance with claim 34, wherein said measuring light source is structurally combined with said decoupling component.

37. The device in accordance with claim 5, wherein the measuring light from said measuring light source is projected onto the workpiece as an envelope of a selected one of (i) a cone, (ii) a truncated cone, and (iii) as straight line segments.

38. The device in accordance with claim 5, wherein the measuring light from said measuring light source is amplitude-modulated at a fixed frequency.

39. The device in accordance with claim 5, wherein the measuring light from said measuring light source can be applied to different observation sites of the workpiece in temporal succession with repetition at a high frequency.

* * * * *